FELL & PHIFER.
Cotton-Planter.

No. 59,765.  Patented Nov. 20, 1866.

WITNESSES:
James L. Ewin
August Tanner

INVENTORS:
Henry R. Fell
Edward Phifer
Per Munroe
Attys

United States Patent Office.

IMPROVEMENT IN COTTON-SEED PLANTER.

HENRY R. FELL AND EDWARD PHIFER, OF TRENTON, NEW JERSEY.

Letters Patent No. 59,765, dated November 20, 1866.

SPECIFICATION.

TO ALL WHOM IT MAY CONCERN:

Be it known that we, HENY R. FELL and EDWARD PHIFER, of Trenton, in the county of Mercer, and State of New Jersey, have made new and useful Improvements in Cotton-Seed Planters; and we do hereby declare the following to be a full, clear, and exact description of the same, sufficient to enable one skilled in the art to which it appertains to construct and use the same, reference being had to the accompanying drawings which are made part of this specification, and in which the same letters indicate corresponding points in the different figures.

Figure 1:
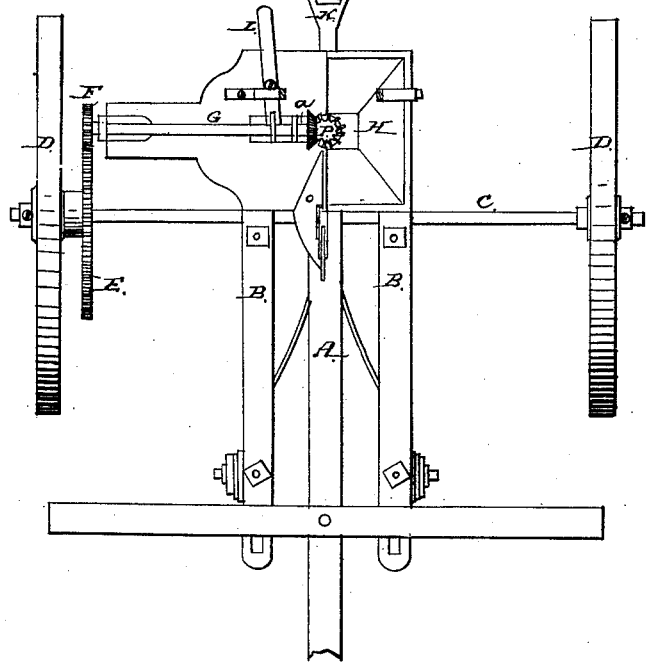

Fig. 1 is a plan or top view.

Figure 2:
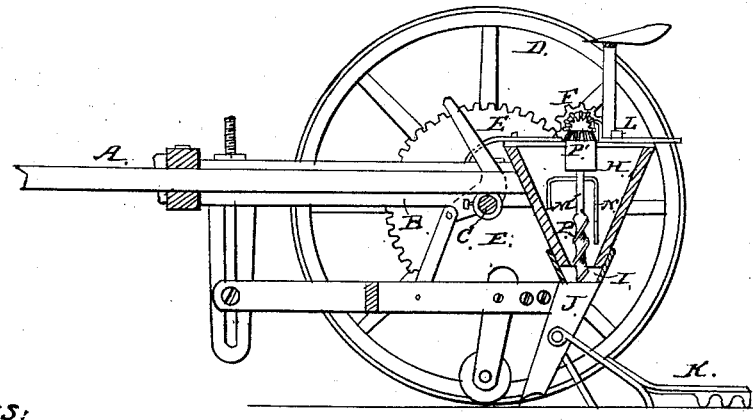

Fig. 2 is vertical longitudinal section. The improvement consists in the means afforded for feeding down from the hopper into the spout an even amount of cotton seed, which as is well known has in its usual condition a covering of fibres by which it becomes aggregated into masses, the seeds tenaciously adhering together and requiring to be mechanically drawn or driven to the point of discharge. The majority of other seeds are of such a character that they will slip or fall by gravitation through the openings or into the pockets or cells in the moving mechanical device by which they are withdrawn from the hopper. In the drawings, A is the tongue of the machine, B the frame supported upon axle C and wheels D; the cog-wheel E is attached to and revolves with one of the wheels, and drives the pinion F, on the shaft G, which rotates in bearings on the frame B, above the hopper H. The hopper is supported in the ordinary manner upon the frame, and has at its lower end a spout I, which leads into the hollow share J, behind which is the covering rake K. The lever L, is pivoted on the frame so as to move the shaft G longitudinally to throw the wheel E in or out of connection with the vertical shaft M which revolves within the hopper. The lower end of the shaft M is twisted like an auger, P; so as to press downwards the seed in contact with its spiral surface in a quantity regulated by the size of the groove in the auger, the throat in which it revolves, and the speed of the revolution. The shaft is provided with stirring-rods, N, whose effect when revolving is to stir up the seed and keep it loose. The shaft is driven by bevel wheels O and P', on the shafts G and M respectively. By a suitable arrangement the feeding screw, P, may be placed in a horizontal instead of a vertical position, and more than one screw may be used in a hopper if desired.

The drawing shows but a single box adapted for planting but one row of seed, but the devices may be multiplied so as to plant any desired number of rows simultaneously, the shaft which rotates the seed devices being prolonged and the latter acting within its appropriate case disposed at the proper distances apart upon the frame of the machine.

Having described our invention, what we claim herein as new, and desire to secure by Letters Patent, is—

The combination with the hopper and spout, of the shaft M, provided with the feeding screw P, and stirring-rods N, operating substantially as described.

HENRY R. FELL,
EDWARD PHIFER.

Witnesses:
WESLEY E. WILSON,
WM. C. HOWELL.